(No Model.) 2 Sheets—Sheet 2.

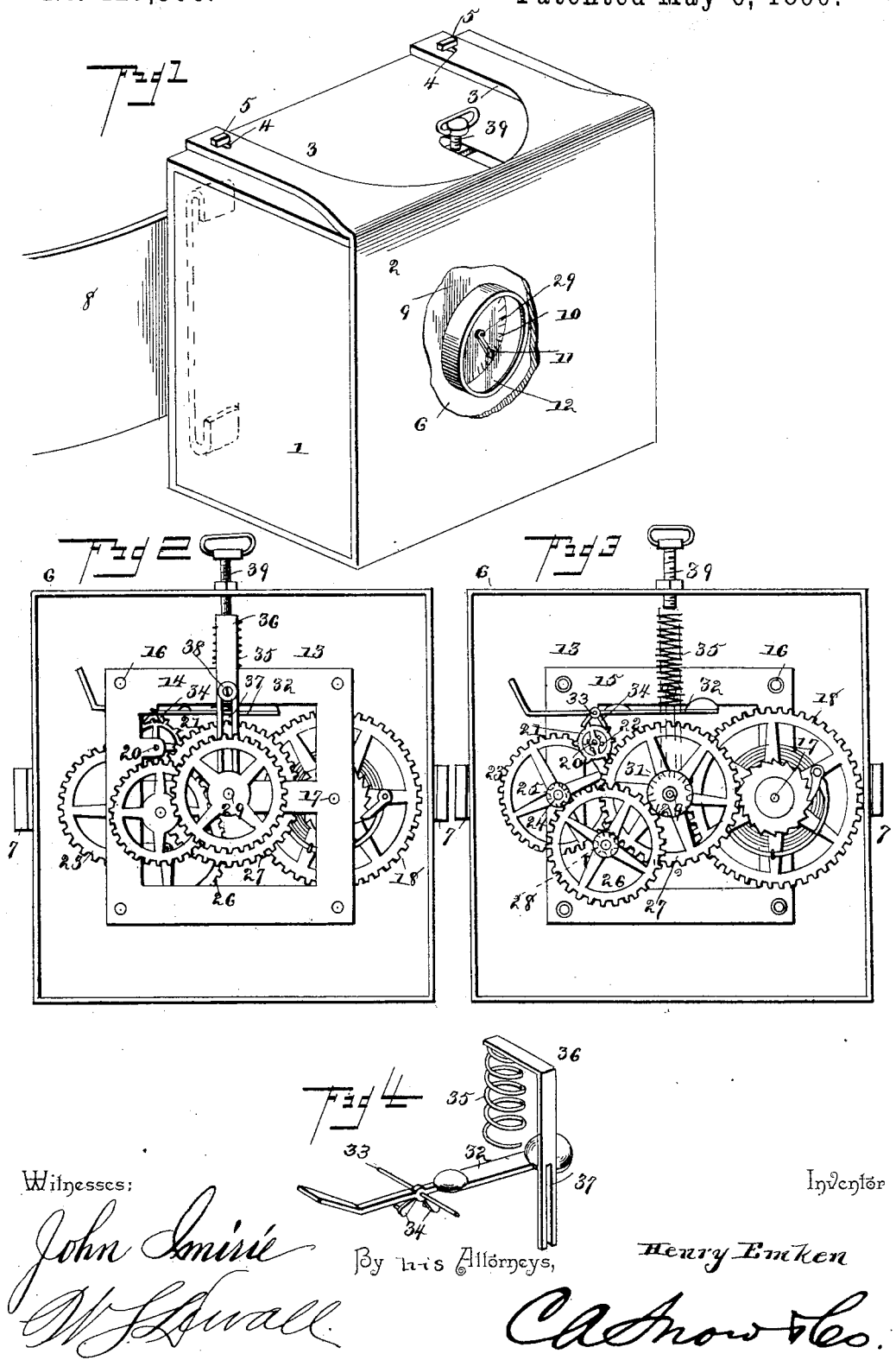

H. EMKEN.
DEVICE FOR MEASURING DISTANCES.

No. 427,306. Patented May 6, 1890.

Witnesses:
John Imirie
W. S. Duvall

Inventor
Henry Emken
By his Attorneys
C. A. Snow & Co.

UNITED STATES PATENT OFFICE.

HENRY EMKEN, OF FORT LOWELL, ARIZONA TERRITORY.

DEVICE FOR MEASURING DISTANCES.

SPECIFICATION forming part of Letters Patent No. 427,306, dated May 6, 1890.

Application filed August 28, 1889. Serial No. 322,213. (No model.)

*To all whom it may concern:*

Be it known that I, HENRY EMKEN, a citizen of the United States, residing at Fort Lowell, in the county of Pima and Territory of Arizona, have invented a new and useful Device for Measuring Distances, of which the following is a specification.

This invention has relation to devices for measuring distances traveled by horsemen; and among the objects in view are to provide an automatic register designed to be strapped to the body of a rider and be operated by the jolting or movement of the animal and to register the number of steps taken by him, which, when compared with the average length of his step as caused by the gait he travels, will accurately render the number of miles traveled.

With these general objects in view the invention consists in a suitable mechanism consisting of essentially a winding mechanism and an escapement actuated thereby, and in a weighted escapement-lever operating upon the escapement of the mechanism, and in means for regulating the power required for operating said lever.

The invention further consists in a suitable case and dial for the mechanism, and, furthermore, in a housing for the case and straps for connecting the same to the body of the wearer.

Figure 5:
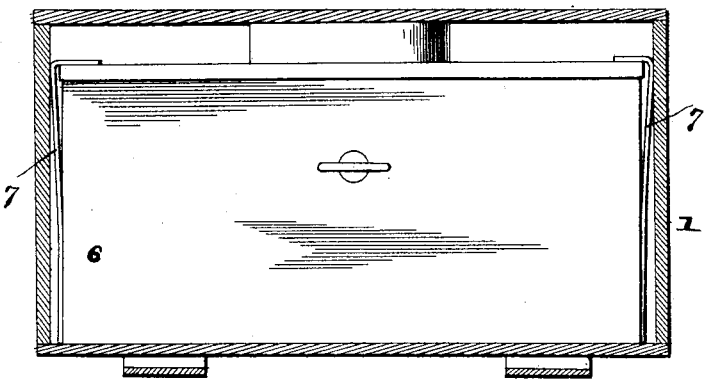
Figure 6:
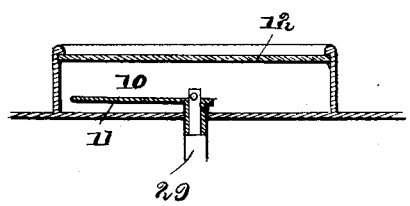

Referring to the drawings, Figure 1 represents a perspective of a distance-measurer constructed in accordance with my invention. Fig. 2 represents a plan of the internal mechanism and its casing. Fig. 3 is a similar view, the upper plate of the frame of the mechanism being removed. Fig. 4 is a detail in perspective, hereinafter referred to. Fig. 5 is a transverse vertical section of the housing, the inner case being in side elevation. Fig. 6 is a detail in section of the pointer and shaft.

Like numerals indicate like parts in all the figures of the drawings.

1 represents a preferably leather or other housing, one wall of which is partially disconnected to form a swinging flap or cover 2, covering the front of the device and terminating in opposite straps 3, having openings 4 near their free ends, and adapted to engage studs 5, extending from the upper wall of the housing.

6 represents an inner casing, preferably formed of light sheet metal, having a rectangular shape, and provided at its opposite walls with exterior wings or flat springs 7, whereby the case is adapted to fit snugly within the housing. A strap 8 is connected with the housing and provided with a suitable buckle and adapted to be fastened around the waist of the wearer.

9 represents the removable cover for the inner case, and upon the same is located a dial 10, over which moves a pointer 11, and inclosing the dial and pointer is the crystal case 12.

13 represents the frame-work of the mechanism, and in this instance the same consists of opposite plates 14 and 15, of rectangular shape and spaced apart at the four corners by binding-bolts and sleeves 16.

17 represents the winding-shaft, one end of which is squared to receive a winding-key and projects through the rear wall of the case. Upon the shaft is mounted the coiled spring and the usual pawl-and-ratchet mechanism and master-gear 18.

20 represents the escapement-shaft, upon which is mounted the escapement-wheel 21, and upon said shaft is also located a small pinion 22, which by a gear 23, mounted on the shaft 24, rotates a small pinion 25 on said shaft, which in turn rotates an intermediate gear 26, which meshes with the gear 27, through the medium of a small pinion 28 mounted on the same shaft with the gear 26, said gear 27 being mounted on the pointer-shaft 29, which carries the pointer over the dial, said pointer being removably mounted upon the shaft, as in an ordinary clock. A small pinion 31 is mounted on the shaft 29, and meshes with the master-gear of the winding mechanism.

32 represents an escapement-lever mounted on the shaft 33, which carries the pawls 34, meshing with the escape-wheel. The escapement lever is weighted at its inner end, and by light coiled spring 35 is yieldingly connected with the inner end of an L-shaped arm 36, the shank of said arm being slotted, as at 37, and riding upon stud 38, projecting from the face of the frame.

39 represents a set-bolt, the outer end of which projects through the inner and outer casings, and the inner end of the same loosely connects and actuates the L-shaped arm so as to adjust the same.

To operate the device the arm is set so that the coiled spring gives more or less resistance to the vibrations of the escaping-lever in accordance with the gait of the horse. For instance, if he be a trotter, the arm is set so that the spring will offer resistance to the vibrations of the lever, or if the gait be an easy gait—such as pacing—the spring is set so as to offer very little resistance.

By securing the average length of step of the animal upon which the device is to be used it will be apparent that an examination of the device at the end of the journey will disclose the number of steps taken, and in this way the number of miles traveled may be accurately determined.

Having thus described my invention, what I claim, and desire to secure by Letters Patent, is—

1. In a device of the class described, the combination, with a suitable casing having a dial, of a winding and escaping mechanism arranged therein and actuating a pointer-shaft carrying a pointer moving over the dial, a weighted escaping-lever mounted above the escape-wheel and carrying escape-pawls and adapted to be vibrated by the agitation of the device as a whole, and a spring pressing upon the lever and adapted to be adjusted relatively to the gait of a horse, substantially as specified.

2. In a device of the class described, a casing, in combination with a winding and escaping mechanism, a dial mounted on the casing, a shaft carrying a pointer moving over the dial and geared to the winding mechanism, a weighted vibrating lever having double pawls engaging the escape-wheel, an adjustable arm mounted over the mechanism, and a set-screw for adjusting the same, and a coiled spring bearing upon one end of the vibrating lever and having its opposite end connected with the upper end of the arm, substantially as specified.

3. The combination, with the inner case and its removable cover, having a dial, of the frame-work consisting of the opposite side pieces bolted and spaced apart, the power-shaft journaled in the frame-work, the master-gear mounted on the shaft, and a coiled spring arranged at one side of the gear, an escaping-shaft arranged at the opposite side of the frame, a weighted vibratory lever mounted above the shaft and carrying opposite pallets operating in the teeth of the escaping-wheel, and a series of gears and pinions for reducing movement meshing with a gear mounted on a central shaft carrying a pointer operating over the dial, and a spring 35, bearing upon the vibratory lever, and means for adjusting the same relative to the gait of a horse, substantially as specified.

4. In a device to measure distances traveled by horsemen, an automatic register adapted to be strapped to the body of the rider and adapted to be operated by the jolting or movement of the animal, and thereby register the number of steps taken by the horse, consisting, essentially, of the usual clock-spring and winding mechanism, an escapement actuated thereby and connected to and actuating a pointer-shaft which carries a pointer moving over the dial, and an escaping-lever operating upon the escapement of said mechanism, said escapement-lever being in turn operated by the jolting or agitation of the device, as set forth.

5. In a device to measure distances traveled by horsemen, an automatic register adapted to be strapped to the body of the rider and adapted to be operated by the jolting or movement of the animal, and thereby register the number of steps taken by the horse, consisting, essentially, of the usual clock-spring and winding mechanism, an escapement actuated thereby and connected to and actuating a pointer-shaft which carries a pointer moving over the dial, and an escaping-lever operating upon the escapement of said mechanism, said escapement-lever being in turn operated by the jolting or agitation of the device, said escapement-lever being weighted and provided with means—such as a spring and set-screw—to regulate the power required to operate the escaping-lever, as set forth.

In testimony that I claim the foregoing as my own I have hereto affixed my signature in presence of two witnesses.

HENRY EMKEN.

Witnesses:
FREDERICK ROECKER,
EDWARD BURNS.